United States Patent
Brunswig et al.

(10) Patent No.: US 7,315,853 B2
(45) Date of Patent: Jan. 1, 2008

(54) SERVICE-ORIENTED ARCHITECTURE FOR ACCESSING REPORTS IN LEGACY SYSTEMS

(75) Inventors: Frank Brunswig, Heidelberg (DE); Arnd Graf, Roemerberg (DE); Martin Kolb, Hambrucken (DE); Ruediger Kretschmer, Bruchsal (DE); Falko Schneider, Sinshelm (DE)

(73) Assignee: SAP AG, Walldorf (DE)

( * ) Notice: Subject to any disclaimer, the term of this patent is extended or adjusted under 35 U.S.C. 154(b) by 22 days.

(21) Appl. No.: 10/963,337

(22) Filed: Oct. 11, 2004

(65) Prior Publication Data

US 2006/0080289 A1  Apr. 13, 2006

(51) Int. Cl.
*G06F 7/00* (2006.01)
*G06F 15/00* (2006.01)

(52) U.S. Cl. .............. 707/3; 707/2; 707/4; 707/5; 707/6; 707/10; 715/500; 715/513

(58) Field of Classification Search .............. 707/3, 707/4, 5, 10; 715/500, 513
See application file for complete search history.

(56) References Cited

U.S. PATENT DOCUMENTS

| | | | |
|---|---|---|---|
| 6,687,873 B1 | 2/2004 | Ballantyne et al. | 715/500 |
| 6,714,979 B1* | 3/2004 | Brandt et al. | 707/3 |
| 2001/0044811 A1* | 11/2001 | Ballantyne et al. | 707/513 |
| 2002/0095399 A1* | 7/2002 | Devine et al. | 707/1 |
| 2002/0133488 A1* | 9/2002 | Bellis et al. | 707/6 |
| 2003/0187849 A1* | 10/2003 | Ruby et al. | 707/10 |
| 2004/0015908 A1* | 1/2004 | Giel et al. | 717/141 |
| 2005/0154742 A1* | 7/2005 | Roth et al. | 707/100 |
| 2005/0171935 A1* | 8/2005 | Nowak et al. | 707/3 |

* cited by examiner

*Primary Examiner*—Shahid Alam
*Assistant Examiner*—Anh Ly
(74) *Attorney, Agent, or Firm*—Finnegan, Henderson, Farabow, Garrett & Dunner, L.L.P.

(57) ABSTRACT

Methods and apparatus, including computer program products, for leveraging legacy reports in a service-oriented architecture include receiving search conditions defining requested data and submitting a request to a reporting server for report results on data in a back-end database. The request defines search criteria, corresponding to the search conditions for identifying data in the back-end, in a format used by the reporting server. Report results are received from the reporting server in response to the request. The report results include data identified in the back-end as matching the search criteria. The reporting server interacts with the back-end and is implemented within an integrated business process architecture having multiple software modules executable on a virtual machine. The integrated business process architecture operates to update data across the software modules in real time, and the back-end includes relational databases for storing data.

13 Claims, 5 Drawing Sheets

SERVICE-ORIENTED ARCHITECTURE FOR ACCESSING REPORTS IN LEGACY SYSTEMS

BACKGROUND

The present invention relates to data processing by digital computer, and more particularly to a service-oriented architecture for accessing reports in legacy systems.

Large-scale business software applications are sometimes thought of as having a "front-end component" and a "back-end" component. The front-end component can include a graphical user interface (GUI) to present data to users and accept data entry from users. Such front-end components are customized for specific customers. The back-end component stores business data and processes the business data according to business logic. The back-end component retrieves, generates, and maintains the business data. The back-end component is usually responsible for the consistency and correctness of the data. The back-end component also can store relationships between the various data. In a typical business software application, the front-end component includes application code to display and aggregate data of the back-end and provides help to generate requests to the back-end for update operations.

The data managed by the back-end is commonly stored in a relational database. Typically, a relational database presents data in the form of multiple two dimensional tables where each table represents an entity type and each row in each table represents an entity. An attribute is a description of a characteristic of an entity or entity type. Typically, an attribute is specified in a field or a column in a database table. Entity types can also have relationships that enable linking one or more entities of an entity type to other entities of another entity type. This linking can be done using foreign keys by having one or more fields in one table pointing to a primary key of a second table. This enables traversing from a set of entities in one table to related entities in another table.

One example of an architecture supporting integrated business applications that use a front-end component and a back-end component is SAP R/3, available from SAP AG of Walldorf (Baden), Germany. In SAP R/3, the front-end component is included in a presentation layer and the back-end component is included in a database layer. Between the presentation layer and database layer is an application layer. Among other features, SAP R/3 includes the ABAP list viewer (ALV), which is a reporting tool for organizing and displaying data from the back-end component based on search criteria.

SUMMARY OF THE INVENTION

The present invention provides methods and apparatus, including computer program products, that access legacy reports from a service-oriented environment.

In one general aspect, the techniques feature receiving search conditions defining data requested in a search and submitting a request to a reporting server for report results relating to data in a back-end. The request defines search criteria corresponding to the search conditions for identifying data in the back-end. The search criteria are submitted in a format used by the reporting server. The report results are received from the reporting server in response to the request, and the report results include data identified in the back-end as matching the search criteria included in the request. The reporting server interacts with the back-end and is implemented within an integrated business process architecture having software modules executable on a virtual machine. The integrated business process architecture operates to update data across the software modules in real time, and the back-end includes relational databases for storing data in the integrated business process architecture.

The invention can be implemented to include one or more of the following advantageous features. The reporting server generates report results using software that intermixes business logic, which identifies data in the back-end according to specified criteria, with user interface programming, which allows users to specify particular criteria and to display generated report results. The reporting server generates a criteria selection user interface, retrieves data from the back-end in accordance with specified criteria, and generates a report results user interface including the retrieved data. The request is submitted by interacting with the criteria selection user interface using the search criteria extracted from the search conditions, and the retrieved data is extracted from the report results user interface. The request is generated without presenting to a client a criteria selection user interface generated by the reporting server, and the report results are received from the reporting server in response to the request without presenting to a client a report results user interface generated by the reporting server.

The search conditions are received through a user interface on a client, and the client user interface differs from a criteria selection user interface generated by the reporting server. Metadata defining a format of the search criteria is produced by inspecting a criteria selection user interface generated by the reporting server, and the request includes the search criteria is generated based on the metadata. The request is submitted and the report results are received by a service-oriented architecture including service providers that process report results to produce enhanced report results not supported by the reporting server. The integrated business process architecture includes an object repository storing definitions of objects included in the software modules, and the integrated business process architecture is a three-tiered architecture including one or more presentation servers, one or more application servers, and the back-end.

A service-oriented architecture includes one or more query interfaces and one or more data interfaces, and a repository includes metadata used by the service-oriented architecture and a client. The metadata defines a model of interaction between the service-oriented architecture and the client, and the model of interaction includes the query interfaces and the data interfaces. Each query interface receives the search conditions from the client and each data interface receives report results from the reporting server in response to the request. Each data interface organizes the data included in the report results in a form defined by the metadata. The search conditions included in the search can be segmented into multiple groups and submitted using separate query service providers.

The invention can be implemented to realize one or more of the following advantages. Investments in legacy reports are preserved by using a service-oriented environment with legacy business systems. Data from legacy reports can be used for reporting in the service-oriented environment. The user interface layer can be separated from the legacy reporting server. Existing reporting logic can be used in more open environments. The invention can also be used to improve flexibility by allowing the legacy reporting server to be used for new applications and in new environments, such as performing searches on a range of values, changing search values by a specified percentage, or using data contained in user interfaces provided by the legacy reporting server in connection with other non-user interface related applications (e.g. as data in a web service or in any other business applications). One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Many enterprise software applications include tools and programming that represent a significant investment of software development resources. In recent years, businesses have developed an increasing interest in web services. In general, web services provide a standardized way of sharing application functions across networks using web protocols and extensible markup language (XML) messages. Conventional enterprise software applications are generally developed for use in traditional architectures and do not provide features that are easily integrated into a web services architecture. Conventional data reporting programs can include valuable underlying programming even where features on the front-end are not optimized for use in web services environments. These conventional, or legacy, data reporting programs (i.e., reports) can be leveraged through a service-oriented architecture that provides interfaces for accessing the legacy reporting programs on behalf of clients that share a model of interaction with the service-oriented architecture and for converting data provided by the legacy reporting programs into a form defined by the model of interaction. The service-oriented architecture can also provide services that extend the available search capabilities and allow retrieved data to be used not only for presentation on a user interface but also by other applications.

Figure 1:
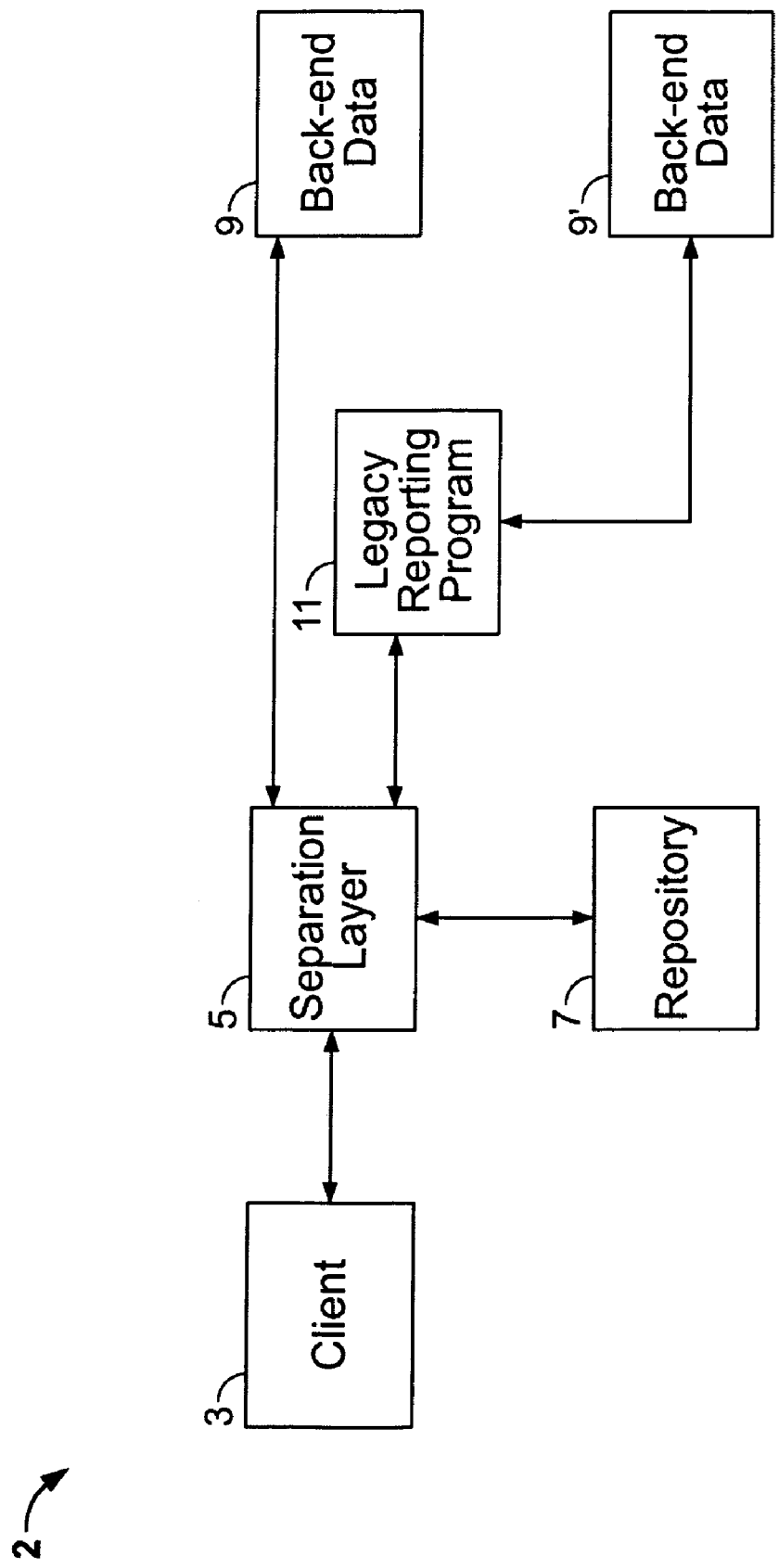
FIG. 1 is a block diagram of an exemplary business software architecture.

As shown in FIG. 1, a business software architecture 2 includes a client 3, a separation layer 5, a repository 7, back-end data 9 and 9', and a legacy reporting program 11. Client 3 provides a front-end user interface (UI) that enables a user to interact with the back-end data 9 and/or that enables a user to interact with back-end data 9' using legacy reporting program 11. Legacy reporting program 11 retrieves back-end data 9' based on search criteria received from the client 3 and generates report results containing the retrieved data in a particular format used by legacy reporting layer 11. Back-end data 9 and 9' can be associated with different back-end applications and/or can be arranged and formatted differently from each other. Separation layer 5 separates the front-end UI provided by client 3 from back-end data 9 and legacy reporting program 11. This separation enables client 3 to interact with back-end data 9 and legacy reporting program 11 in a manner that is consistent with a model of interaction between client 3 and other applications and services supported by separation layer 5. In other words, separation layer 5 provides a canonical interface to back-end data 9 so that client 3 can interact with separation layer 5 and only needs to be updated if separation layer 5 changes. In addition, separation layer 5 provides a canonical interface to legacy reporting program 11. Client 3 can obtain the benefit of functionalities integral to legacy reporting program 11 without being limited to presentation layouts, search formats, or report result formats supported by legacy reporting program 11. Changes to client 3 can be made without changing legacy reporting program 11 and without being subject to constraints imposed by legacy reporting program 11. For example, client 3 need not be limited to requesting report results for display on the UI but can be an application or service that uses the report results for other purposes.

As described in more detail below, separation layer 5 is based on a meta model that defines how back-end data 9 and legacy reporting program 11 are represented in separation layer 5. The meta model is based on metadata, which provides a description of how data in a particular environment is organized, formatted, and accessed. Metadata is stored in repository 7 that describes how the back-end data 9 and the legacy reporting program 11 are accessed using a meta model representation. Client 3 interacts with back-end data 9 and legacy reporting program 11 using a generic command set defined by separation layer 5. Separation layer 5 accesses service providers that perform the generic commands from client 3, using metadata in repository 7, to effect the requested manipulation of back-end data 9 and legacy reporting program 11. The service providers are configurable so that different service providers can be used for back-end data 9 and legacy reporting program 11. Separation layer 5 includes an interface (e.g., a service manager) that hides the characteristics of the back-end data 9 and legacy reporting program 11 and also the service implementation details (i.e., the service providers).

Figure 2:
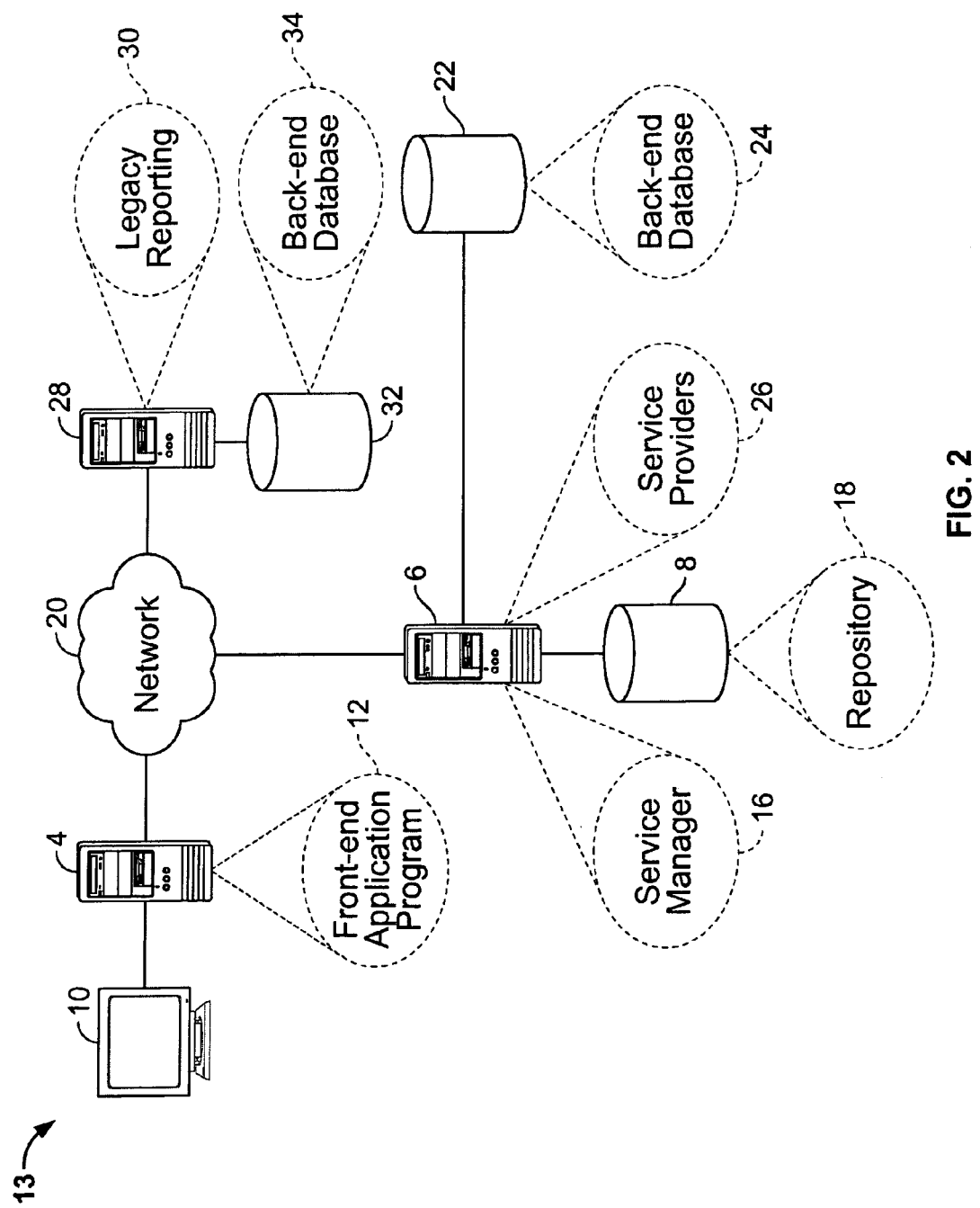
FIG. 2 is a block diagram of an exemplary implementation of a business software architecture.

As shown in FIG. 2, an exemplary business software architecture 13 includes a first computer 4, a second computer 6, and a third computer 28. The computers 4, 6, and 28 each can Include a processor, a computer readable storage medium, such as a random access memory (RAM) and a program memory (for example, a writable read-only memory (ROM) such as a flash ROM), a hard drive controller, a video controller, and an input/output (I/O) controller coupled by a processor (CPU) bus. The computers 4, 6, and 28 can be preprogrammed, in ROM, for example, or the computers 4, 6, and 28 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 20 connects computers 4, 6, and 28. The network 20 is any form or medium of digital data communication, e.g., a communication network. Examples of communication network 20 include a local area network ("LAN") and a wide area network ("WAN"), e.g., the Internet. In some cases, two or more of computers 4, 6, and 28 can be implemented as different software programs loaded onto the same device.

Computer 4 executes instructions of a front-end application program 12. Application program 12 represents a front-end component of the business software architecture 13. Service manager 16, running on computer 6, is a service layer between the front-end application program 12 and a set of back-end service providers 26. Service manager 16 provides a service interface to front-end application program 12 to enable indirect interaction with the set of back-end service providers 26 running on computer 6. This service interface allows for a partial separation of software development for front-end application program 12 and the set of back-end service providers 26.

Computer 6 generally implements a service-oriented architecture and includes a data storage device 22 that stores a back-end database 24 containing data that can be used by one or more of the set of back-end service providers 26. Computer 28 includes a data storage device 32 that stores a back-end database 34 (or in back-end database 24) that can be used by a legacy-reporting server 30 on computer 28. The set of back-end service providers 26 also includes service providers that interact with legacy reporting server 30. Computer 6 further includes a data storage device 8 containing an information repository 18 that defines and describes the services provided by the set of back-end service providers 26. Metadata in repository 18 is organized according to a meta model.

In general, a meta model is a collection of "concepts" that are the vocabulary with which a certain domain can be described. Meta models typically are built according to a strict rule set, which in most cases is derived from entity-relationship-attribute or object-oriented modeling. The front-end application program 12 can access (and interpret according to the strict rule set) the contents of repository 18 via the service manager 16. The services included in the meta model support the functionality of application program 12 and include retrieving, reading and modifying data in back-end database 24. The service providers 26 can access or modify data in back-end database 24 to provide services to front-end application program 12. Furthermore, the services include requesting, receiving, and organizing data in back-end database 34 that can be retrieved by legacy reporting server 30. The service providers 26 can access the legacy reporting server 30 to provide report results to front-end application program 12. To provide the various services, the back-end service providers 26, upon request from the front-end application program 12, either access or modify data in back-end database 24, calculate new data, or request and receive report results from legacy reporting server 30.

The repository 18 defines a syntax for requesting services provided by the set of back-end service providers 26 and semantically describes the services. As front-end application program 12 executes, front-end application program 12 can use this syntax and semantic description from the repository 18 (accessed through the service manager 16) to determine what services front-end application program 12 can use to meet its requirements. This syntax and semantic description for stored or computed back-end data and for accessing service providers 26 can be referred to as "metadata". Metadata can also include syntax and semantic descriptions of interfaces with legacy reporting server 30.

The stored or computed back-end data in back-end databases 24 and 34 is conceptually organized using object-oriented terminology in terms of business objects, where each business object is an instance of a class or data entity type. In one example, a class of business objects presents data in the form of a relational database table where each row of data in the table represents the data for a particular business object. In this example, each field in the table represents an attribute of the business object class. In another example, there is a class of business objects that partially refers to a relational database table such that some of the fields in the table represent attributes of the business object class and other fields are computed upon request. In another example, a class of business objects refers to a format of a search request used by legacy reporting server 30 and another class of business objects refers to a format of report results generated by legacy reporting server 30.

In the business software architecture 13, services provided to front-end application program 12 are focused on data (i.e., data-centric) so the description of these services in repository 18 is also data-centric. Thus, the metadata in repository 18 is structured around representations of classes of these business objects. This metadata includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of back-end service providers 26 on instances of these aspects.

Classifications of data, relations between data classes, prebuilt queries for accessing data, and other descriptions of data provided by the set of back-end service providers 26 are represented by repository 18. This representation, or metadata, of data (e.g., stored in back-end database 24 or retrievable through legacy reporting server 30) provided by the set of back-end service providers 26 describes different abstract types or classes of data in back-end database 24 and how different data classes relate to each other. Objects are instances of these different abstract types. Metadata is information about data rather than content of the data. The metadata also defines a set of pre-built queries that can be executed on the data in database 24 or on report results offered by legacy reporting server 30.

The semantic description in repository 18 can enable front-end application program 12 to determine which services to request from service manager 16. These services often take the form of requesting data to display. Front-end application program 12 reads the metadata in repository 18 and can flexibly request data organized in different ways that are specified by the metadata. For example, front-end application program 12 can read repository 18 to obtain descriptions of data available through service providers 26 that interact with back-end database 24 and also to obtain descriptions of data available through service providers 26 that interact with legacy reporting server 30.

For requesting the services described by the semantic description in repository 18, service manager 16 provides a canonical interface for services on the business objects in the back-end (including requests for report results and report results retrieved through reporting server 30). This canonical interface includes specialized actions that are defined for specific classes of business objects and queries that can be defined for clusters of classes of business objects. The clusters are modeled as service modules in the metadata. These actions and queries are also defined in the metadata of the repository 18.

During execution, front-end application program 12 issues service requests to service manager 16, service manager 16 checks the requests for consistency with the metadata in repository 18, and then the service manager 16 passes the requests to back-end service providers 26 according to the metadata in the repository database 18. The manner of implementing the set of back-end service providers 26, data in database 24, and legacy reporting server 30 (in addition to data in database 34) is independent of front-end application 12, with back-end service providers 26, data in database 24, and legacy reporting server 30 conforming to the definitions and descriptions of the metadata in the repository 18.

Front-end application program 12 provides user interfaces displayed on monitor 10. Front-end application program 12 provides application code to display and aggregate the data received from the set of back-end service providers 26. Front-end application program 12 generates requests, via service manager 16, to the set of back-end service providers 26 for operations such as executing a search request (e.g., a query) or performing an action on an aspect. Front-end application program 12 is interaction-centric, focused on aggregating data of the back-end service providers 26 and combining interactive steps into a flow of screens and syndicated screen elements.

Front-end application program 12 contains screen-flow logic of User Interface (UI) oriented applications and front-end application program 12 binds a UI to the metadata in repository 18. Front-end application program 12 can be indirectly bound to a specific set of back-end services by back-end service providers 26 via descriptions of the services in the metadata of the repository 18. Front-end application program 12 can also be formed from various generic interaction-centric front-end layers that are only bound by configuration to a highly standardized service layer by service manager 16 serving as an intermediary to back-end service providers 26. The service manager 16 provides an interface (defined by the metadata in repository 18) to front-end application program 12 that hides the characteristics of the corresponding back-end service providers 26, data in database 24, and legacy reporting server 30. The service manager 16 provides the interface to front-end application program 12 by receiving and executing requests from front-end application program 12 to back-end service providers 26.

After each receipt of a request by the service manager 16, the service manager 16 delegates the request to one or more service providers 26. Service providers 26 represent instances of software classes such as a query service provider class, an aspect service provider class, and an action service provider class. Query service providers handle queries on data in back-end database 24 and on report results in legacy reporting server 30 from front-end application program 12. Aspect service providers handle accessing and modifying data, navigation through relations, and calling actions. For example, aspect service providers can handle extracting and organizing data from report results generated by legacy reporting server 30. Aspect service providers can have a standard set of methods that correspond to standard operations on aspects that can be requested from the service manager 16. These standard operations can include select, insert, update, delete, select by relation, and update fields. Action service providers enable execution of actions on aspects. The software classes for service providers 26 can be implemented as ABAP global classes maintained by the ABAP class library using the ABAP development environment available from SAP of Walldorf, Germany. They also can be implemented by any other programming language on any other platform, e.g., Java on Linux or C# on Windows.

Upon receiving a request for a service represented by an element in repository 18, the service manager 16 can look up a name of a service provider 26 in the metadata for the element in repository 18. For example, the metadata describing an aspect in repository 18 defines which aspect service provider 34 is designed to handle services for the aspect. The service manager 16 uses this information in the metadata to direct requests from the front-end application program 12 to the appropriate aspect service provider 34. Similarly, the metadata describing a query in repository 18 defines which query service provider 32 is designed to handle services for the query.

The interface provided by the service manager 16 provides requests or commands to front-end application program 12. As mentioned previously, standard commands select, insert, update, delete, select by relation, and update fields are standard operations on aspects in the repository 18. These standard operations are provided by aspect service provider 34 and correspond to some of the requests or commands available to front-end application program 12. A "Select" command provides a capability such that if the identifiers (or keys) of instances of a data type provided by an aspect service provider are known, front-end application program 12 can select and read the attributes of these instances. An "Insert" command allows front-end application program 12 to add new instances of a data type provided by the aspect service provider. A "Select By Relation" command provides a capability that if a data type is known, front-end application program 12 can find other data types that have relations to this data type as defined in repository 18. An "Update" command provides a capability to modify instances of data types provided by the aspect service provider. A "Delete" command provides the capability to delete one or more selected instances of one or more data types provided by the aspect service provider.

An "Execute" action command provides a capability to execute a semantically defined action on one or more instances of one or more data types provided by the aspect service provider. Either the aspect service provider or an action service provider executes the Execute action command. A "Query" command provides a capability to search and find particular data of interest. The Query command is a method with a fixed set of search parameters and a result set with a defined structure. Queries are defined for particular service modules, or clusters of aspects in the metadata of the repository 18. A query service provider executes a Query command.

Figure 3:
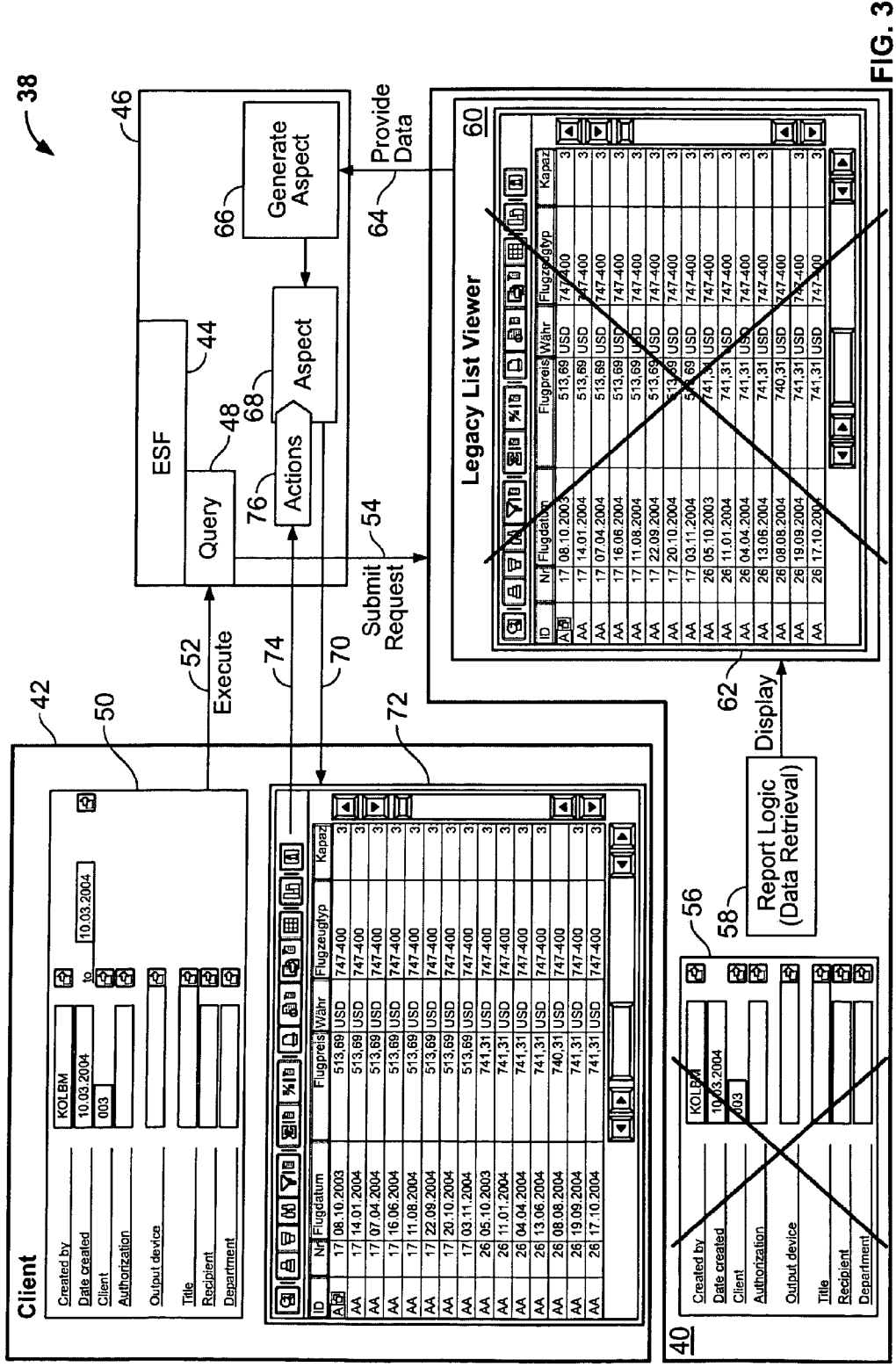
FIG. 3 is a flow diagram for retrieving report results from a legacy reporting server.

As shown in FIG. 3, a process 38 for retrieving report results from a legacy reporting server 40 includes receiving search conditions through a client 42, submitting search criteria corresponding to the search conditions using a service module 46 in a service-oriented architecture 44 (e.g., a legacy report access layer) to interface with the legacy reporting server 40, generating report results by the legacy reporting server 40 in response to the search criteria, extracting data from the report results in the service module 46, and forwarding search results to the client 42. The service module 46 includes one or more query service providers 48 that interface with the legacy reporting server 40. The client 42 includes a user interface that displays and receives user-defined search conditions through a search condition selection screen 50. A search is executed (52) by submitting the search conditions in an "Execute" action command to the query service provider 48 that corresponds to the type of search to be performed and/or to the legacy reporting server 40 to be used. As a result, the query service provider 48 organizes the received search conditions in a form required by the legacy reporting server 40 and submits a request (54) for report results to the legacy reporting server 40.

In general, the legacy reporting server 40 is implemented using software that intermixes report logic for retrieving data with programming to enable a display of a criteria selection user interface and a report results user interface. As a result, the query service provider 48 is operable to insert the search criteria contained in the submitted request into appropriate fields of the criteria selection user interface without presenting the criteria selection user interface to the client 42 (e.g., without actually displaying the criteria selection user interface, as indicated at 56). The format of the request (e.g., a mapping of search criteria to appropriate fields) can be determined by a manual or automated inspection of the criteria selection user interface. The format can then be stored in metadata of the service-oriented architecture 44 for use in describing parameters for the query service providers 48, describing the search criteria fields available to the client 42, and defining the format for submitting data to the criteria selection user interface.

In response to the request, report logic 58 within the legacy reporting server 40 retrieves data in accordance with the legacy reporting server's normal operation. In general, the legacy reporting server 40 includes a legacy list viewer 60 that is typically operable to display a report results user interface. In this case, however, the query service provider 48 (or an aspect service provider included in the service module 46) is operable to extract data contained in the report results generated and provided (64) by the legacy list viewer 60 without presenting the report results user interface to the client 42 (e.g., without actually displaying the output of the legacy list viewer 60, as indicated at 62). The extracted data is used to generate an aspect 68 (as indicated at 66). The format of the report results data 64 (e.g., a mapping of report results fields to the aspect 68) can be determined by a manual or automated inspection of the report results user interface and is stored in metadata of the service-oriented architecture 44 for use in mapping report results data to aspect rows and identifying available actions.

The aspect 68 generated as a result of executing (52) a search is delivered (70) to the client 42 for display on the user interface on a list viewer screen 72. In general, report results are displayed as a list that includes multiple columns, with each column corresponding to a particular attribute or data type, including key columns for key attributes. A "key" is an identifier of an instance of a data type provided by the service providers 26. Instances of business object classes are identified by unique keys within a service module, for example the number of an order or the id of a product. The list viewer screen 72 generally includes action user interface components for calling standard actions (e.g., sort, filter, sum, and the like) or application-specific actions (e.g., process order). Selecting an action user interface component sends (74) an "Execute" action command to a corresponding action service provider 76, which performs a designated action on the aspect 68 and, in some cases, results in a new or updated list viewer screen 72. In some implementations or for some actions, an action service provider can alternatively submit a request to the legacy list viewer 60 to return new data or data in a different format, which results in generating a new aspect. The available actions can be based on commands available in the legacy reporting server 40 and/or on actions that are defined within the service module 46.

For each report supported by the legacy reporting server 40, a different service module can be generated. Each service module includes one or more query service providers and one or more aspects along with any associated aspect service providers and action service providers. The action service provider is called by the service manager 16 to execute an action for an aspect. Action service provider 44 has one method EXECUTE. EXECUTE method takes as input parameters an aspect name (ASPECT), a set of keys (INKEYS) specifying which instances of the aspect are acted upon by the action, a generic input parameter (INPARAM), the name of the action (ACTION) to be executed, a set of keys (RELATION_INKEY) for an action acting on an relation, and a name of the relation (RELATION). EXECUTE method returns as output parameters the changed or newly created objects (OUTRECORDS), which have been modified by the action. The objects returned by the OUTRECORDS parameter are transported to the client 42.

The aspect service provider is called by service manager 16 to provide functionality to read and modify the content of one or more aspects. An aspect is described by its name (the name is globally unique within a repository), an associated data structure, an associated key (i.e. identifier) structure, a set of implemented actions, a set of outgoing relations, and a set of incoming relations. The query service provider performs queries. The query service provider has one EXECUTE method that performs a query on one or more aspects. Input parameters include the name of the query (QUERY), a data structure (INPARAM) containing the parameters for the query, and an optional table-type parameter (INKEYS), containing the keys of the aspect rows to which the query shall be restricted. INKEYS can but does not have to consist of the keys of OUTRECORDS returned by EXECUTE method. INKEYS can be of any key aspect structure.

The client 42 can be implemented in a presentation layer using the iView feature in SAP Enterprise Portal, available from SAP AG, of Walldorf (Baden), Germany, or using Java Server Pages or can be implemented in an application layer. The client 42 can also be implemented using other development tools or technologies, or can be a custom application. The legacy reporting server 40 can be implemented in an integrated business process architecture, such as SAP AG's ABAP List Viewer in the SAP R/3 system, which includes multiple software modules and that is executable on a virtual machine. The integrated business process architecture can operate to update data across the software modules in real time and the back-end can include one or more relational databases for storing data in the integrated business process architecture. The architecture can be three-tiered having one or more presentation servers, one or more application servers, and a back-end and can also include an object repository storing definitions of objects included in the software modules.

Figure 4:
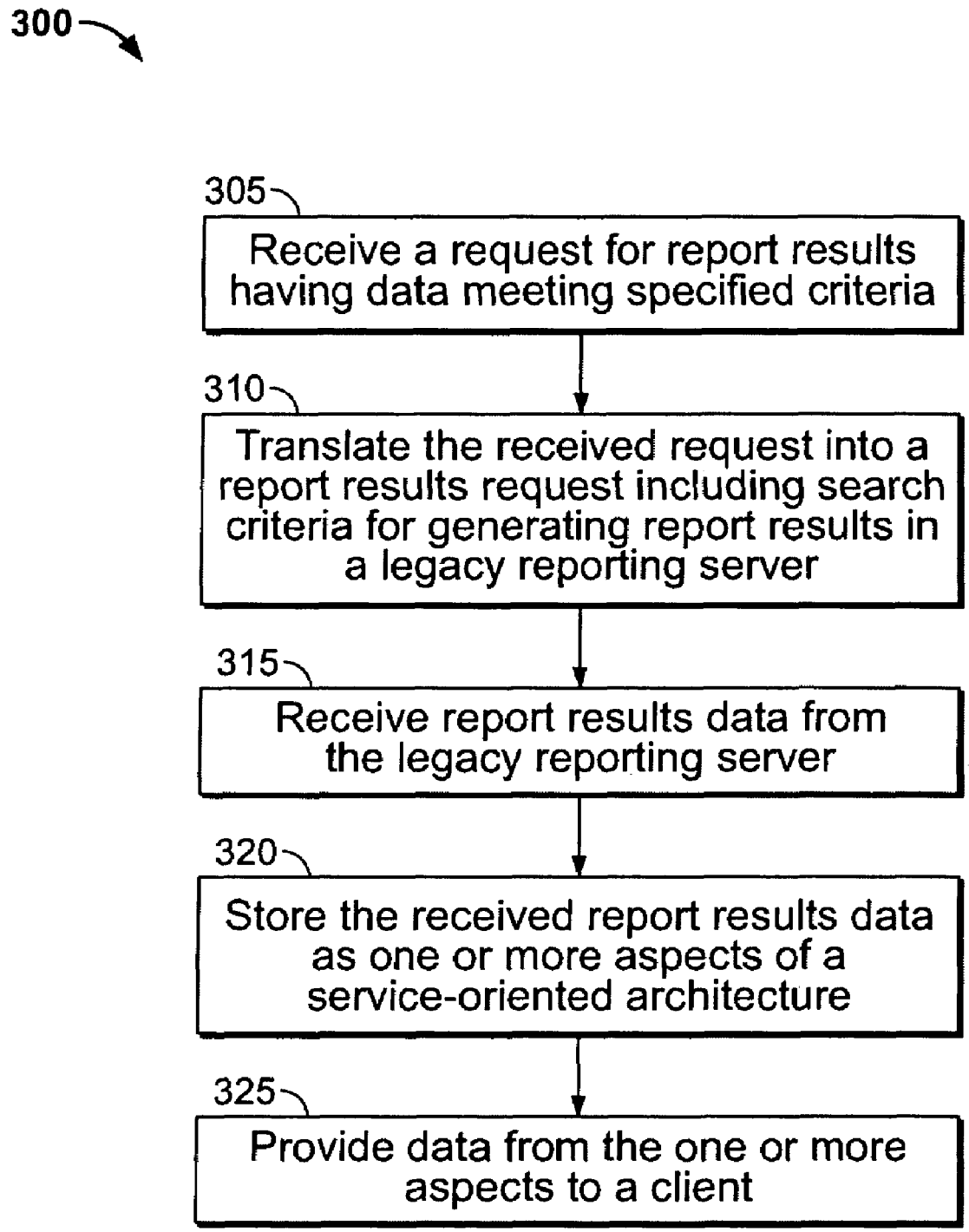
FIG. 4 is a flow diagram for retrieving report results from a legacy reporting server.

As shown in FIG. 4, a process 300 for retrieving report results from a legacy reporting server includes receiving (305) a request for report results having data meeting specified criteria. The request can be received from a client that includes a user interface through which the criteria are received from a user. Alternatively, the request can be received from an application or service provider in a business process architecture. The request can be received by a service-oriented architecture. The received request is translated (310) into a report results request including search criteria for generating report results in a legacy reporting server. In general, the translation is performed in an service-oriented architecture using metadata that defines a format and protocol for interacting with a reporting server that intermixes business logic for performing a search with programming for a criteria selection user interface and a report results user interface.

Report results data is received (315) from the legacy reporting server. The report results data is generally extracted from a user interface generated by the legacy reporting server in accordance with metadata stored in the service-oriented architecture. The received report results data is then stored (320) as one or more aspects of a service-oriented architecture. Data from the aspects can be provided (325) to a client. The client can include a user interface for displaying the data in a particular format or can be an application that uses the data to perform other operations.

The separation layer provided by the service-oriented architecture can be used to expand the capabilities of the legacy reporting server. For example, searches can be performed on a range of values or by changing one or more values by a specified percentage using a query service provider that automatically calculates the values to be searched before providing the search criteria to the legacy reporting server. Similarly, service providers in the service-oriented architecture can be used to produce enhanced report results (e.g., by performing calculations on received data or by aggregating results from multiple different searches) that are not supported by the legacy reporting server. In addition, interfaces between the service-oriented architecture and the legacy reporting server, which are provided by service providers and their associated metadata in the service-oriented architecture, can be populated with information defining how search criteria from a received request is mapped to the criteria selection user interface of the legacy reporting server and how report results from the legacy reporting server are mapped to one or more aspects. In some cases, user interfaces for submitting search criteria and for displaying search criteria differ from the user interfaces generated by the legacy reporting server in appearance, available actions, and/or functionality, although in other cases they may be identical.

Figure 5:
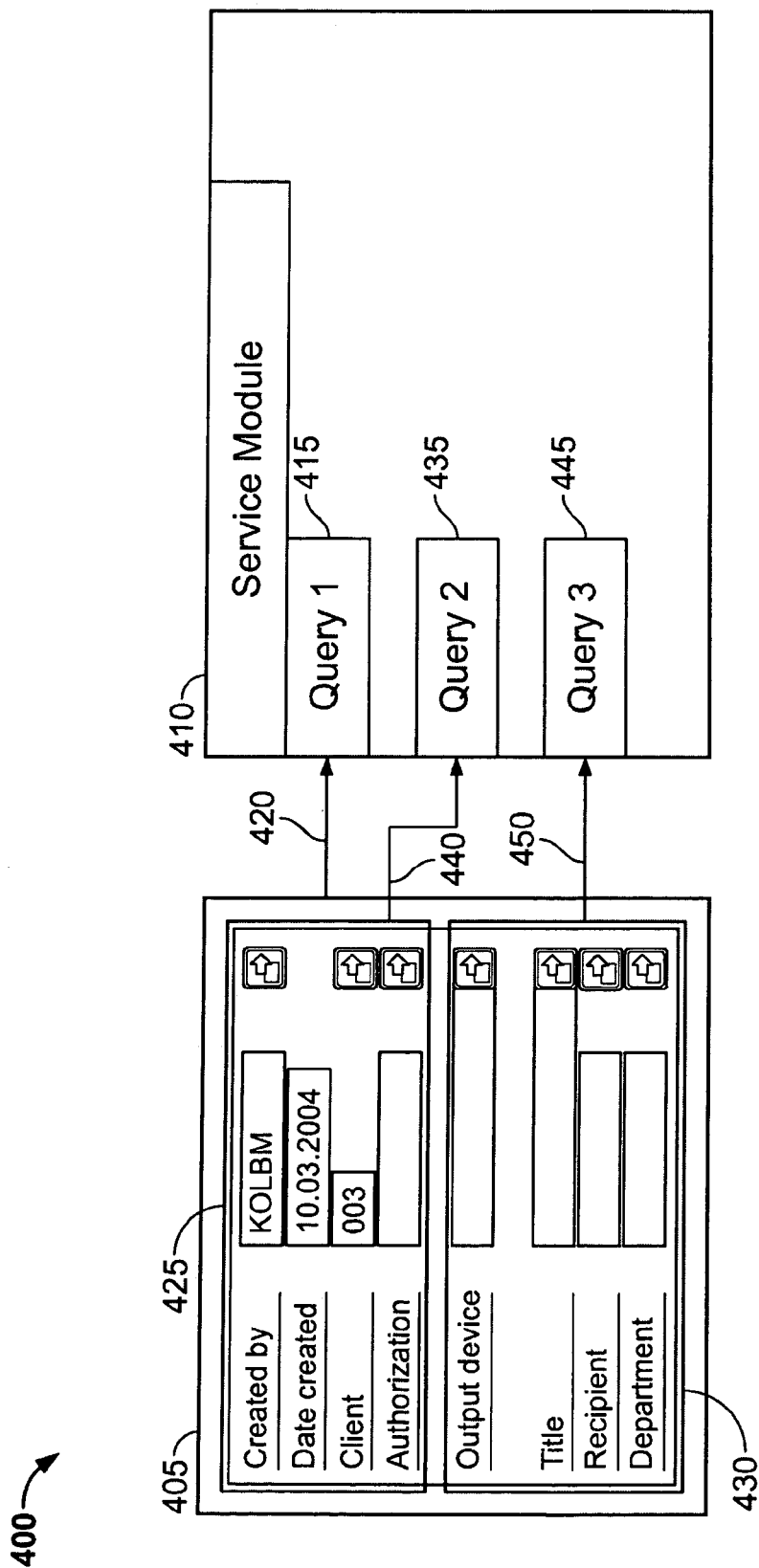
FIG. 5 is a flow for segmenting search conditions received through a client user interface into multiple queries.

FIG. 5 is a process 400 for segmenting search conditions interface into multiple queries. In some implementations, a relatively large number of possible search condition fields are available. The search condition fields can be displayed on a user interface 405 and can correspond to search criteria fields for the legacy reporting server. To simplify the mapping between the search condition fields (of a user interface in a service-oriented architecture) and the search criteria fields (for the legacy reporting server), search condition fields for a first query 415 can be grouped into semantically related fields 425 and 430 for developing less complex queries 435 and 445. Accordingly, searches that include search conditions within a particular group 425 or 430 can be executed (440 or 450) by the less complex queries 435 or 445.

In addition, particularly for complex search condition selection screens, it may be desirable to segment the search conditions received through a client user into multiple separate requests. A search can be initiated from a client user interface 405 by executing a first query 415 in a service module 410 (as indicated at 420). The service provider for the first query 415 can automatically segment the received search conditions into a first subset of search conditions 425 and a second subset of search conditions 430. A second query 435 is executed (as indicated at 440) for the first subset of search conditions 425, and a third query 445 is executed (as indicated at 450) for the second subset of search conditions 430. The second and third queries 435 and 445 can each send separate report results requests to the legacy reporting server, which results in a creation of separate aspects in the service module 410. The service provider for the first query 415 can combine the separate aspects into a single aspect that is used to provide report results to the client user interface 405.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an Information carder, e.g., in a machine readable storage device (such as a computer-readable storage medium) or in a propagated signal, for execution by, or to control the operation of, a data processing apparatus or data processing system, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. Other embodiments are within the scope of the following claims.

What is claimed is:

1. A computer-readable storage medium containing instructions executable by a data processing apparatus, the instructions, when executed, causing the data processing apparatus to perform stages, the stages comprising:
   receiving one or more search conditions defining data requested in a search, the one or more search conditions correlating to a first data structure format;
   translating the one or more search conditions into a request format receivable by a reporting server, the request format being different than the first data structure format and consistent with a format required in normal operation of the reporting server;
   submitting a request to the reporting server for report results relating to data in a back-end database, the request defining search criteria corresponding to the one or more search conditions for identifying data in the back-end database, the search criteria submitted in the request format used by the reporting server;
   receiving report results from the reporting server in response to the request, the report results including data identified in the back-end database as matching the search criteria included in the request, wherein the back-end database comprises at least one relational database for storing data;
   implementing an integrated business process architecture operating to update data across a virtual machine in real time; and displaying the received results to a user.

2. The computer-readable storage medium of claim 1, wherein the report results received from the reporting server are generated using software that intermixes business logic for identifying data in the back-end database according to specified criteria selected via a user interface.

3. The computer-readable storage medium of claim 1, wherein the reporting server is operable to generate a criteria selection user interface, to retrieve data from the back-end database in accordance with specified criteria, and to generate a report results user interface including the retrieved data, the stages:
   submitting the request by automatically interacting with the criteria selection user interface of the reporting server, wherein the interaction with the interface includes using the search criteria extracted from the one or more search conditions; and
   interacting with the report results user interface of the reporting server to extract the retrieved data.

4. The computer-readable storage medium of claim 1 wherein the reporting server is operable to cause a display of a criteria selection user interface, to retrieve data form the back-end database in accordance with specified criteria, and to cause a display of a report results user interface including the retrieved data, the computer program further comprising instructions operable to cause one or more processors to:
   generate the request without presenting to a client a criteria selection user interface generated by the reporting server; and
   receive the report results from the reporting server in response to the request without presenting to a client a report results user interface generated by the reporting server.

5. The computer-readable storage medium of claim 1 wherein the one or more search conditions are received through a user interface on a client, the client user interface differing from a criteria selection user interface generated by the reporting server.

6. The computer-readable storage medium of claim 1 wherein metadata defining a format of the search criteria is produced by inspecting a criteria selection user interface generated by the reporting server and the request including the search criteria is generated based on the metadata.

7. The computer-readable storage medium of claim 1, wherein the computer program further causes the data processing apparatus to implement a service-oriented architecture in submitting the request and receiving the report results, the service-oriented architecture including at least one service provider operable to process one or more report results to produce enhanced report results not supported by the reporting server.

8. The computer-readable storage medium of claim 1 wherein the integrated business process architecture further comprises an object repository storing definitions of objects, the definitions of objects being used as a basis for the translation of the communications received by the data processing apparatus.

9. The computer-readable storage of claim 1 wherein the integrated business process architecture further comprises a three-tiered architecture including at least one presentation server, at least one application server, and the back-end database.

10. A data processing system comprising:
    means for receiving one or more search conditions defining data requested in a search, the one or more search conditions correlating to a first data structure format;
    means for translating the one or more search conditions into a request format receivable by a reporting server, the request format being different than the first data structure format and consistent with a format required in normal operation of the reporting server;
    means for submitting a request to the reporting server for report results relating to data in a back-end database, the request defining search criteria corresponding to the one or more search conditions for identifying data in the back-end database, the search criteria submitted in a format used by the reporting server;

means for receiving report results from the reporting server in response to the request, the report results including data identified in the back-end database as matching the search conditions included in the request, the back-end database comprising at least one relational database; and means for displaying the received results to a user;

wherein the reporting server interacts with the back-end database and is implemented within an integrated business process architecture executable on a virtual machine operating to update data in real time.

11. The system of claim 10, wherein the report results received from the reporting server are generated using software that intermixes business logic for identifying data in the back-end database according to specified criteria selected via a user interface.

12. The system of claim 10, wherein the reporting server is operable to generate a criteria selection user interface, to retrieve data from the back-end database in accordance with specified criteria, and to generate a report results user interface including the retrieved data, the system further comprising:

means for submitting the request by interacting with the criteria selection user interface of the reporting server, using the search criteria extracted from the one or more search conditions; and means for automatically interacting with the report results user interface to extract the retrieved data.

13. The system of claim 10 further comprising:

means for segmenting the one or more search conditions included in the search into a plurality of groups; and wherein the means for submitting a request further comprises one of a plurality of means for submitting a request, with each of the plurality of means for submitting a request operable to submit a request comprising search conditions included in one of the plurality of groups.

* * * * *